(12) United States Patent
Torii

(10) Patent No.: US 9,004,529 B2
(45) Date of Patent: Apr. 14, 2015

(54) VEHICLE SIDE DOOR STRUCTURE AND PASSENGER PROTECTING SYSTEM

(75) Inventor: Nobuyuki Torii, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/344,992

(22) PCT Filed: Nov. 2, 2011

(86) PCT No.: PCT/JP2011/075342
§ 371 (c)(1),
(2), (4) Date: Mar. 14, 2014

(87) PCT Pub. No.: WO2013/065158
PCT Pub. Date: May 10, 2013

(65) Prior Publication Data
US 2014/0367947 A1 Dec. 18, 2014

(51) Int. Cl.
*B60R 21/207* (2006.01)
*B60R 21/04* (2006.01)
*B60J 5/04* (2006.01)
*B60R 21/231* (2011.01)
*B60R 21/00* (2006.01)

(52) U.S. Cl.
CPC ........... *B60R 21/0428* (2013.01); *B60J 5/0461* (2013.01); *B60R 21/23138* (2013.01); *B60R 2021/0006* (2013.01); *B60R 2021/0055* (2013.01)

(58) Field of Classification Search
CPC ...... B60J 5/0425; B60J 5/0451; B60J 5/0452; B60R 20/0428

USPC ............... 280/730.2, 751; 296/146.6, 187.05, 296/187.12
See application file for complete search history.

(56) References Cited

U.S. PATENT DOCUMENTS

| 4,272,103 | A |   | 6/1981 | Schmid et al. |
|---|---|---|---|---|
| 5,395,135 | A | * | 3/1995 | Lim et al. ...................... 280/751 |
| 5,542,738 | A | * | 8/1996 | Walker et al. ............ 296/187.05 |

(Continued)

FOREIGN PATENT DOCUMENTS

| JP | A-53-147323 | 12/1978 |
|---|---|---|
| JP | A-7-232554 | 9/1995 |

(Continued)

OTHER PUBLICATIONS

Sep. 15, 2014 European Search Report issued in European Patent Application No. EP 11874900.1.

*Primary Examiner* — Paul N Dickson
*Assistant Examiner* — Robert A Coker
(74) *Attorney, Agent, or Firm* — Oliff PLC

(57) ABSTRACT

A vehicle side door structure has: a door outer panel; a door inner panel having a service hole; a door trim mounted to a vehicle transverse direction inner side of the inner panel; an inner pad provided, between the inner panel and the trim, spanning, in a vehicle longitudinal direction, over an outer peripheral edge of the hole as seen in a vehicle side view; and an outer pad between the outer and inner panels overlapping a vehicle transverse direction outer side of the inner pad as seen in a vehicle side view, and having a first region that, at a side collision, is pushed by the outer panel and passes through the hole and pushes the inner pad toward the trim side, and a second region that, at a side collision, separates from the first region and pushes the inner pad toward the trim side via the inner panel.

8 Claims, 9 Drawing Sheets

(56) References Cited

U.S. PATENT DOCUMENTS

| | | | |
|---|---|---|---|
| 5,580,119 A | 12/1996 | Uchida et al. | |
| 5,865,496 A | 2/1999 | Odan et al. | |
| 6,955,391 B1* | 10/2005 | Peng | 296/146.6 |
| 7,341,277 B2* | 3/2008 | Huttsell et al. | 280/751 |
| 7,357,444 B2* | 4/2008 | Cowelchuk et al. | 296/146.7 |
| 7,695,051 B2* | 4/2010 | Abe | 296/187.03 |
| 8,152,218 B2* | 4/2012 | Hall et al. | 296/146.6 |
| 2003/0184061 A1* | 10/2003 | Honda et al. | 280/730.2 |
| 2006/0267317 A1* | 11/2006 | Ida et al. | 280/730.2 |
| 2009/0184501 A1* | 7/2009 | Hirotani | 280/730.2 |
| 2009/0224571 A1 | 9/2009 | Huttsell et al. | |

FOREIGN PATENT DOCUMENTS

| | | |
|---|---|---|
| JP | A-2005-138838 | 6/2005 |
| JP | A-2008-94235 | 4/2008 |
| JP | A-2008-254635 | 10/2008 |
| JP | A-2011-513136 | 4/2011 |

* cited by examiner

VEHICLE SIDE DOOR STRUCTURE AND PASSENGER PROTECTING SYSTEM

TECHNICAL FIELD

The present invention relates to a vehicle side door structure and a passenger protecting system.

BACKGROUND ART

Patent Document 1 (Japanese Patent Application Laid-Open (JP-A) No. 07-232554) discloses a structure in which a door pad (an outer pad) is provided at a position corresponding to the waist region of a passenger seated in a vehicle seat between the inner panel and the outer panel of a side door, and a trim pad (an inner pad) is provided at the door trim, and moreover, the work opening of the inner panel is set to be larger than the outer shape of the door pad.

Further, Patent Document 2 (JP-A No. 2005-138838) discloses a structure provided with a first impact absorbing pad that is supported at an impact bar provided at the inner surface of an outer panel, a second impact absorbing pad that is mounted to an inner panel at a position that is at the vehicle inner side of the first impact absorbing pad, and a third impact absorbing pad that is fixed to the door trim at a position that is at the vehicle inner side of the second impact absorbing pad. In this structure, the first impact absorbing pad, the second impact absorbing pad and the third impact absorbing pad are set at a height corresponding to an opening hole of the inner panel.
[Patent Document 1] JP-A No. 07-232554
[Patent Document 2] JP-A No. 2005-138838
[Patent Document 3] JP-A No. 2008-254635

DISCLOSURE OF INVENTION

Technical Problem

In a case in accordance with above-described Patent Document 1, at the time of a side collision, due to the door pad pushing the trim pad without hitting the inner panel, it is possible that the energy absorption amount will be increased. However, in a vehicle in which a large work opening cannot be formed at a position corresponding to the waist region of a passenger seated in the vehicle seat, at the time of a side collision, it is difficult to push the waist region of the passenger at an early stage over a wide area (surface area) by the door pad and trim pad. Further, because of the structure in which the door pad is detached from the mounting portion of the impact bar at the time of a side collision, it is difficult to stably and uniformly push the waist region of the passenger.

Further, in a case in accordance with above-described Patent Document 2, the second impact absorbing pad passes-through the opening hole of the inner panel and is mounted to the inner panel via a holding member. In a vehicle in which a large opening hole cannot be formed at a position corresponding to the waist region of a passenger seated in the vehicle seat, at the time of a side collision, it is difficult to push the waist region of the passenger at an early stage over a wide surface area by the respective impact absorbing pads.

In consideration of the above-described circumstances, an object of the present invention is to provide a vehicle side door structure and passenger protecting system that, at the time of a side collision, can push the waist region of a passenger at an early stage over a wide surface area.

Solution to Problem

A vehicle side door structure of a first aspect relating to the present invention comprises: a door outer panel that is disposed at a vehicle transverse direction outer side; a door inner panel that is disposed at a vehicle transverse direction inner side, and is formed in a shape of a bag together with the door outer panel, and in which a service hole is formed in an intermediate portion in a vehicle longitudinal direction; a door trim that is mounted to a vehicle transverse direction inner side of the door inner panel; an inner pad that is disposed between the door inner panel and the door trim, and is provided so as to span, in the vehicle longitudinal direction, over an outer peripheral edge of the service hole as seen in a vehicle side view, and that absorbs impact from a vehicle side surface; and an outer pad that is disposed between the door outer panel and the door inner panel, and is provided so as to overlap a vehicle transverse direction outer side of the inner pad as seen in a vehicle side view, and that has a first region that, at a time of a side collision, is pushed by the door outer panel, passes-through the service hole and pushes the inner pad toward the door trim side, and a second region that, at a time of a side collision, separates from the first region along the outer peripheral edge of the service hole, and, independently of the first region, pushes the inner pad toward the door trim side via the door inner panel.

In a vehicle side door structure of a second aspect relating to the present invention, in the vehicle side door structure of the first aspect, a fragile portion is provided at the outer pad along the outer peripheral edge of the service hole so as to become a starting point of breaking the outer pad into the first region and the second region at a time of a side collision.

In a vehicle side door structure of a third aspect relating to the present invention, in the vehicle side door structure of the first aspect or the second aspect, an impact beam extends along the vehicle longitudinal direction between the door outer panel and the door inner panel, and the first region and the second region at the outer pad are mounted to the impact beam by individual brackets.

In a vehicle side door structure of a fourth aspect relating to the present invention, in the vehicle side door structure of any one aspect of the first aspect through the third aspect, at the outer pad, the second region is structured to be harder than, or have a higher rigidity than, the first region.

In a vehicle side door structure of a fifth aspect relating to the present invention, in the vehicle side door structure of the first aspect, the outer pad is divided in advance along the outer peripheral edge of the service hole into the first region and the second region.

In a vehicle side door structure of a sixth aspect relating to the present invention, in the vehicle side door structure of the fifth aspect, an impact beam extends along the vehicle longitudinal direction between the door outer panel and the door inner panel, and the first region and the second region at the outer pad are mounted to the impact beam by individual brackets.

In a vehicle side door structure of a seventh aspect relating to the present invention, in the vehicle side door structure of the fifth aspect or the sixth aspect, at the outer pad, the second region is structured to be harder than, or have a higher rigidity than, the first region.

A passenger protecting system of an eighth aspect relating to the present invention comprises the vehicle side door structure of any one aspect of the second aspect through the fourth aspect, wherein a side airbag device, at which, at a time of a side collision, a bag body inflates and expands between the door trim and a waist region of a passenger seated in a vehicle seat, is provided at an interior of the door trim or at a side portion of a seat back that structures a portion of the vehicle seat.

In accordance with the vehicle side door structure of the first aspect relating to the present invention, the inner pad is provided so as to span, in the vehicle longitudinal direction, over the outer peripheral edge of the service hole as seen in a vehicle side view, between the door inner panel in which the service hole is formed and the door trim that is mounted to the vehicle transverse direction inner side thereof. Further, the outer pad is provided between the door outer panel and the door inner panel so as to overlap the vehicle transverse direction outer side of the inner pad as seen in a vehicle side view. Namely, the outer pad is provided with a first region that faces the service hole and a second region that corresponds to the door inner panel. Further, when the door outer panel intrudes in toward the vehicle transverse direction inner side at the time of a side collision, the first region that is pushed by the door outer panel passes-through the service hole and pushes the inner pad toward the door trim side, and further, the second region that is pushed by the door outer panel separates from the first region along the outer peripheral edge of the service hole, and, independently of the first region, pushes the inner pad toward the door trim side via the door inner panel. Therefore, even if the outer pad is disposed so as to span, in the vehicle longitudinal direction, over the outer peripheral edge of the service hole as seen in a vehicle side view, the outer pad catching on the door inner panel and the region that faces the service hole not being able to push the inner pad at an early stage is remedied. Accordingly, at the time of a side collision, the waist region of the passenger seated in the vehicle seat can be pushed at an early stage over a wide surface area.

In accordance with the vehicle side door structure of the second aspect relating to the present invention, the fragile portion is provided at the outer pad along the outer peripheral edge of the service hole. Due to the fragile portion of the outer pad hitting a vicinity of the outer peripheral edge of the service hole at the door inner panel accompanying the incursion of the outer panel at the time of a side collision, the outer pad breaks into the first region and the second region with the fragile portion being the starting point. Due thereto, the outer pad is divided into the first region and the second region, and can independently move toward the door trim side. Therefore, the inner pad can be pushed at an early stage over a wide range by the first region and the second region.

In accordance with the vehicle side door structure of the fifth aspect relating to the present invention, the outer pad is divided in advance into the first region and the second region along the outer peripheral edge of the service hole. Accompanying the incursion of the outer panel at the time of a side collision, the first region and the second region independently move toward the door trim side. Therefore, the inner pad can be pushed at an even earlier stage over a wide range by the first region and the second region.

In accordance with the vehicle side door structure of the third aspect or the sixth aspect relating to the present invention, the first region and the second region at the outer pad are mounted to the impact beam by individual brackets. At the time of a side collision, the first region and the second region are supported without being detached from the impact beam. Therefore, as compared with a case in which the first region and the second region are detached from the impact beam, the input to the waist region of the passenger seated in the vehicle seat is stable.

In accordance with the vehicle side door structure of the fourth aspect or the seventh aspect relating to the present invention, at the outer pad, the second region is structured to be harder than or have a higher rigidity than the first region. At the time of a side collision, the second region can more strongly push the inner pad via the door inner panel.

In accordance with the passenger protecting system of the eighth aspect relating to the present invention, the side airbag device is provided at the side portion of the seat back that structures a portion of the vehicle seat, or at the interior of the door trim. At the time of a side collision, the side airbag inflates and expands between the door trim and the waist region of the passenger seated in the vehicle seat. Therefore, the impact, that is transmitted from the door trim to the door inner panel due to the inflation and expansion of the side air bag, is utilized, and the outer pad can break into the first region and the second region at an early stage with the fragile portion being the starting point.

Advantageous Effects of Invention

In accordance with the vehicle side door structure and passenger protecting system relating to the present invention, at the time of a side collision, the waist region of a passenger can be pushed at an early stage over a wide surface area.

BEST MODES FOR CARRYING OUT THE INVENTION

A first embodiment of a vehicle side door structure relating to the present invention is described hereinafter by using FIG. 1 through FIG. 5. Note that arrow FR that is shown appropriately in these drawings indicates the vehicle front side, arrow UP indicates the vehicle upper side, and arrow OUT indicates the vehicle transverse direction outer side.

Figure 1:
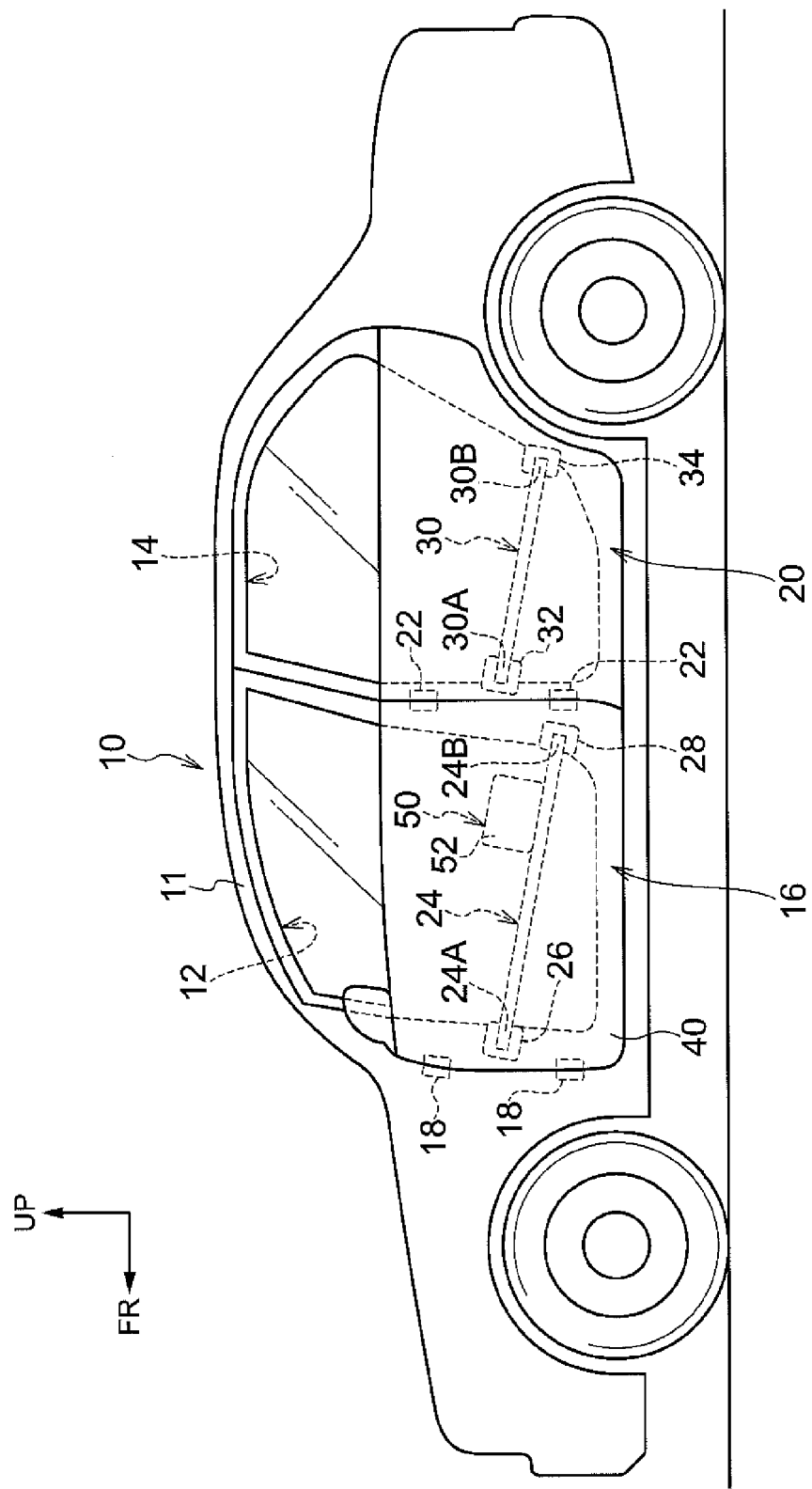
FIG. 1 is a side view showing a side portion of a vehicle to which a vehicle side door structure relating to a first embodiment is applied.

The side portion of a vehicle, to which the vehicle side door structure relating to the present embodiment is applied, is shown in a side view in FIG. 1. As shown in FIG. 1, a front side door opening portion 12 and a rear side door opening portion 14 are formed in the vehicle longitudinal direction in the side portion of a main body 11 of a vehicle 10. A front side door 16 is mounted to the front side door opening portion 12 by hinges 18 so as to be able to open and close, and a rear side door 20 is mounted to the rear side door opening portion 14 by hinges 22 so as to be able open and close. The front side door 16 has a door outer panel 40 that is disposed at the vehicle transverse direction outer side, and a door inner panel 42 (see FIG. 3) that is disposed at the vehicle transverse direction inner side.

An impact beam 24 is disposed along the vehicle longitudinal direction at the interior of the front side door 16. A front end portion 24A of the impact beam 24 is fixed to the front end portion of the door inner panel 42 via a bracket 26. A rear end portion 24B of the impact beam 24 is fixed to the rear end portion of the door inner panel 42 via a bracket 28. A vehicle side door structure 50 of the present embodiment is applied to the front side door 16. An outer pad 52 is mounted to the rear end portion 24B side of the impact beam 24 at the interior of the front side door 16. The vehicle side door structure 50 is described in detail later.

An impact beam 30 is disposed along the vehicle longitudinal direction at the interior of the rear side door 20. A front end portion 30A and a rear end portion 30B of the impact beam 30 are fixed to the front and rear end portions of a door inner panel (not illustrated) via brackets 32, 34, respectively. Note that, although illustration thereof is omitted, a door outer pad is mounted to the rear end portion 30B side of the impact beam 30.

Figure 2:
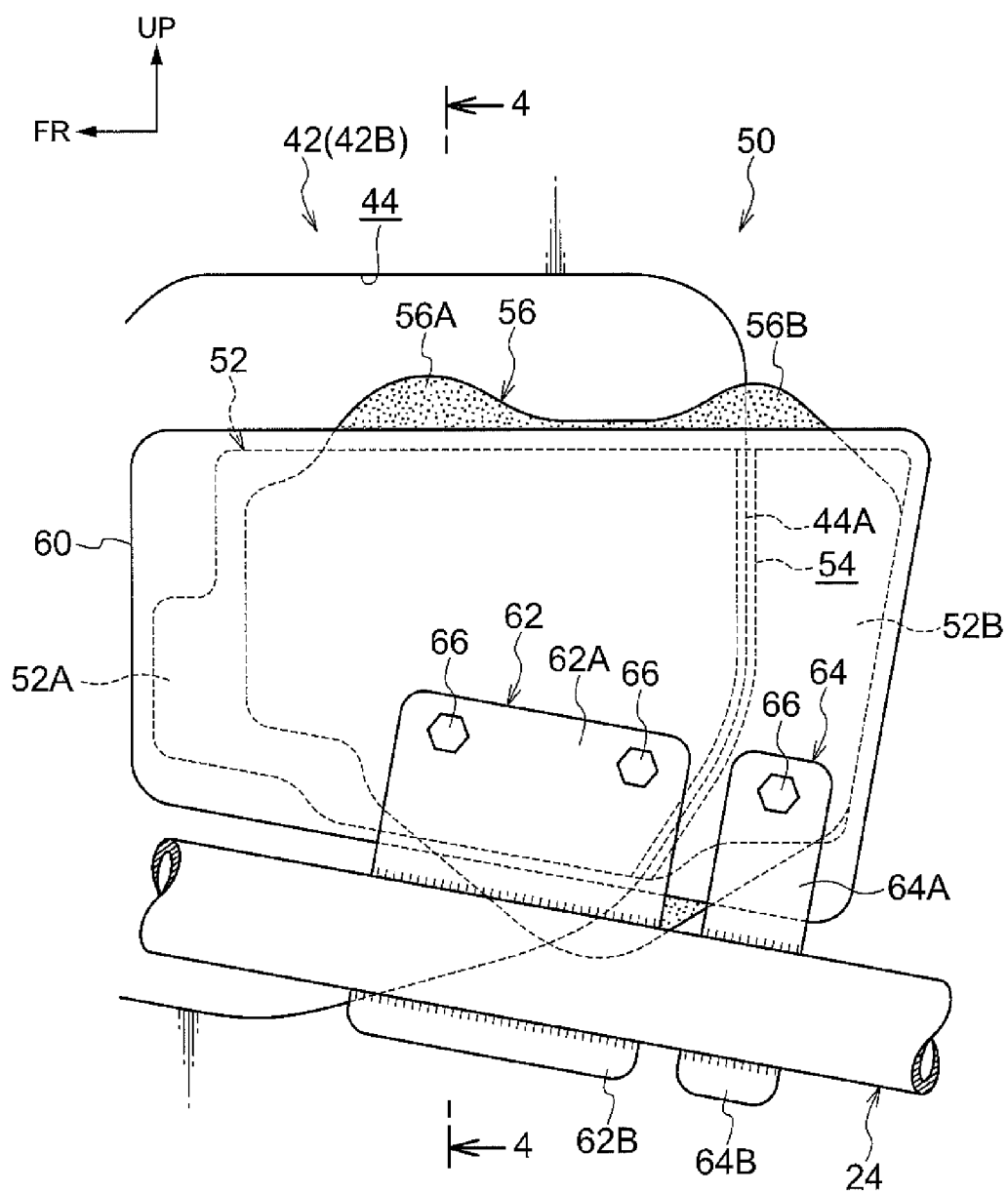
FIG. 2 is an enlarged side view of main portions showing, in a state viewed from a vehicle transverse direction outer side, the mounted states of an outer pad and an inner pad that are used in a front side door to which the vehicle side door structure shown in FIG. 1 is applied.
Figure 3:
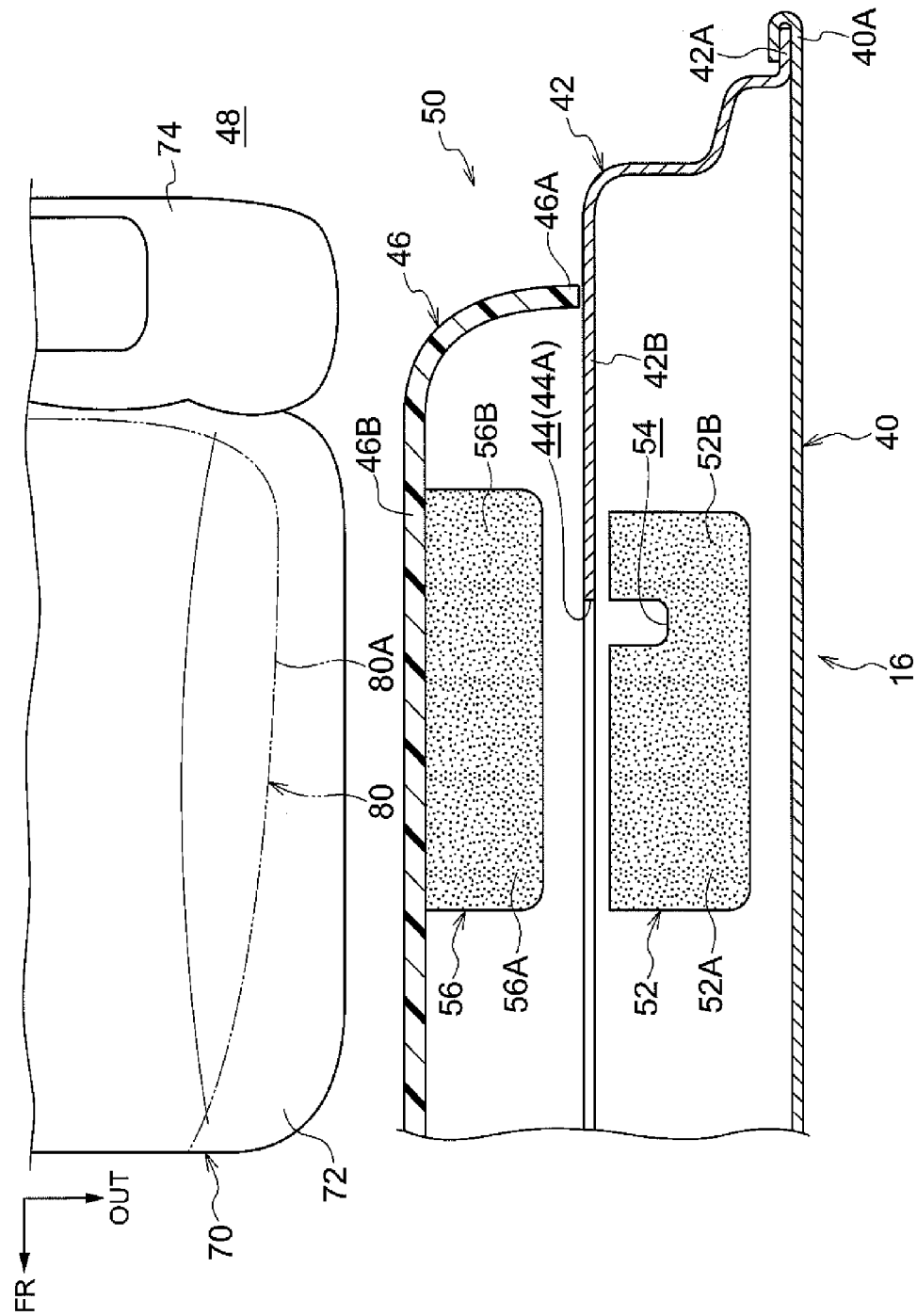
FIG. 3 is a plan sectional view showing the mounted states of the outer pad and the inner pad that are used in the front side door shown in FIG. 2.
Figure 4:
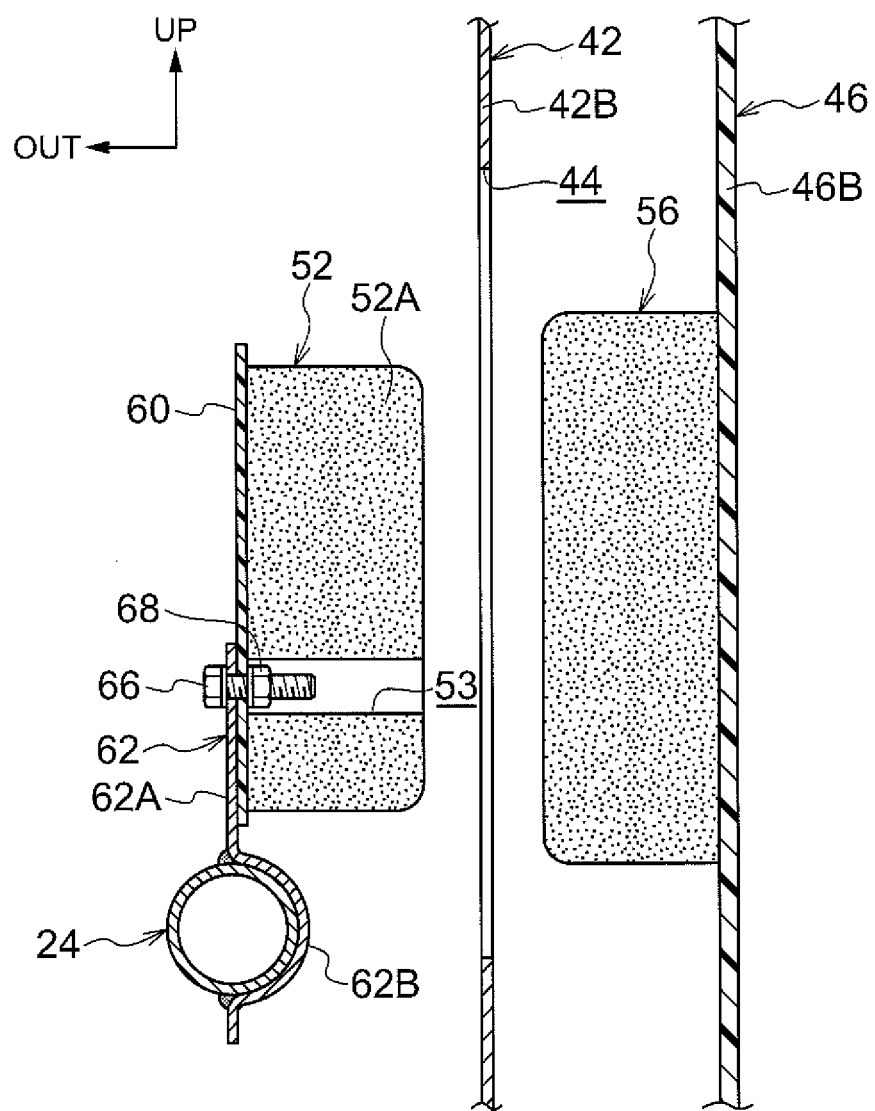
FIG. 4 is a vertical sectional view taken along line 4-4 of FIG. 2.

The mounted states of an outer pad and an inner pad of the front side door 16 to which the vehicle side door structure 50 is applied are shown in FIG. 2 in an enlarged side view that is seen from the vehicle transverse direction outer side. Further, the mounted states of the outer pad and the inner pad of the front side door 16 are shown in FIG. 3 in a plan sectional view, and the mounted states of the outer pad and the inner pad of the front side door 16 are shown in FIG. 4 in a vertical sectional view (a vertical sectional view taken along line 4-4 of FIG. 2). As shown in FIG. 3, at the front side door 16, a peripheral edge portion 40A of the door outer panel 40 that is made of metal is made integral by a hemming process with a peripheral edge portion 42A of the door inner panel 42 that is made of metal, so as to structure a closed cross-section. A vertical wall portion 42B, that projects-out toward the vehicle transverse direction inner side from the peripheral edge portion 42A and that is disposed in the vehicle vertical direction and the vehicle longitudinal direction, is formed at the intermediate portion in the vehicle longitudinal direction of the door inner panel 42. As shown in FIG. 2 through FIG. 4, a service hole 44, that is formed from an opening that is substantially elliptical, is formed in a vicinity of the central portion of the vertical wall portion 42B at the door inner panel 42.

A door trim 46 made of resin is mounted by unillustrated clips or the like to the vehicle transverse direction inner side of the vertical wall portion 42B of the door inner panel 42 (see FIG. 3 and the like). The door trim 46 is curved, from an end portion 46A in the vehicle longitudinal direction, so as to protrude-out toward the vehicle transverse direction inner side (a vehicle cabin 48 side), and a vertical wall portion 46B is formed along the vehicle vertical direction and the vehicle longitudinal direction at the vehicle transverse direction inner side of this curved surface.

An inner pad 56 for absorbing impact from the vehicle side surface, is disposed between the door inner panel 42 and the door trim 46. The inner pad 56 is fixed by an adhesive or the like to the outer side wall surface (the wall surface at the vehicle transverse direction outer side) of the vertical wall portion 46B at the door trim 46. As seen in a vehicle side view, the inner pad 56 is disposed so as to span, in the vehicle longitudinal direction, over an outer peripheral edge 44A at the vehicle rear side of the service hole 44. Namely, a front side region 56A in the vehicle longitudinal direction of the inner pad 56 is disposed so as to face the service hole 44, and a rear side region 56B in the vehicle longitudinal direction of the inner pad 56 is disposed so as to face the vertical wall portion 42B of the door inner panel 42 (see FIG. 2 and FIG. 3). In the state in which the inner pad 56 is fixed to the vertical wall portion 46B of the door trim 46, a gap is provided between the outer side wall surface of the rear side region 56B of the inner pad 56 and the inner side wall surface of the door inner panel 42. The inner pad 56 is formed of an elastic body of foamed resin or rubber or the like.

The outer pad 52 for absorbing impact from the vehicle side surface is disposed between the door outer panel 40 and the door inner panel 42. As seen in a vehicle side view, the outer pad 52 is disposed so as to overlap the vehicle transverse direction outer side of the inner pad 56. Namely, as seen in a vehicle side view, the outer pad 52 is formed in a substantially rectangular shape, and is disposed so as to span, in the vehicle longitudinal direction, over the outer peripheral edge 44A at the vehicle rear side of the service hole 44. The outer pad 52 is formed of an elastic body of foamed resin or rubber or the like.

A groove portion (notch) 54, that serves as a fragile portion and that is sunken-in toward the vehicle transverse direction outer side, is formed in the wall surface at the vehicle transverse direction inner side of the outer pad 52, along the outer peripheral edge 44A at the vehicle rear side of the service hole 44. The outer pad 52 has a front side region (first region) 52A that is disposed at the vehicle front side of the groove portion 54 and so as to face the service hole 44, and a rear side region (second region) 52B that is disposed at the vehicle rear side of the groove portion 54 and so as to face the vertical wall portion 42B of the door inner panel 42 (see FIG. 2 and FIG. 3).

As shown in FIG. 2 and FIG. 4, the wall surface at the vehicle transverse direction outer side of the outer pad 52 is fixed by an adhesive or the like to a resin plate 60. As seen in a vehicle side view, the resin plate 60 is formed in a substantially rectangular shape, and is formed to be one size larger than the outer shape of the outer pad 52.

The resin plate 60 is mounted to the impact beam 24 by two brackets 62, 64 that are disposed at the vehicle front and rear sides (see FIG. 2). More concretely, the bracket 62 is fixed to the region, that corresponds to the front side region 52A of the outer pad 52, at the resin plate 60, and the bracket 64 is fixed to the region, that corresponds to the rear side region 52B of the outer pad 52, at the resin plate 60.

The bracket 62 has a mounting portion 62A that is planar and that is disposed in a state of planarly contacting the resin plate 60, and a concave portion 62B that is formed at the lower side of the mounting portion 62A (see FIG. 4). Further, the impact beam 24 is a pipe-shaped member that has predetermined strength and rigidity. As seen in a vehicle rear view, the concave portion 62B of the bracket. 62 is formed in a substantially semicircular shape so as to project-out toward the vehicle transverse direction inner side. The concave portion 62B is disposed so as to contact the peripheral surface of the impact beam 24, and is joined thereto by arc welding (see FIG. 2 and FIG. 4). Two bolt through-holes are formed in the mounting portion 62A. Through-holes 53, that are circular and are one size larger than the bolt through-holes, are formed in the outer pad 52 along the vehicle transverse direction at positions facing the bolt through-holes of the mounting portion 62A (see FIG. 4). The mounting portion 62A is disposed in a state of planarly contacting the resin plate 60, and the mounting portion 62A and the resin plate 60 are fastened and fixed by bolts 66 and nuts 68 from the both sides thereof. Note that the nuts 68 may be fixed in advance to the resin plate 60, and the bolts 66 may be inserted-through from the mounting portion 62A side and screwed-together. Due to the mounting portion 62A and the resin plate 60 being fastened and fixed by the two sets of bolts 66 and nuts 68 at the vehicle front and rear sides, the resin plate 60 that corresponds to the front side region 52A is fixed to the impact beam 24 via the bracket 62.

The bracket 64 is formed such that the width thereof in the vehicle longitudinal direction is shorter than the bracket 62. The bracket 64 has a mounting portion 64A that is planar and that is disposed in a state of planarly contacting the resin plate 60, and a concave portion 64B that is formed at the lower side of the mounting portion 64A. As seen in a vehicle rear view, the concave portion 64B is formed in a substantially semicircular shape so as to project-out toward the vehicle transverse direction inner side. The concave portion 64B is disposed so as to contact the peripheral surface of the impact beam 24, and is joined thereto by arc welding (see FIG. 2). The mounting portion 64A is disposed in a state of planarly contacting the resin plate 60, and the mounting portion 64A and the resin plate 60 are fastened and fixed by one set of the bolt 66 and a nut (not illustrated) from the both sides thereof. Due thereto, the resin plate 60 that corresponds to the rear side region 52B is fixed to the impact beam 24 via the bracket 64. In the state in which the outer pad 52, that is adhered to the resin plate 60, is fixed to the impact beam 24 via the brackets 62, 64, a gap is formed between the surface at the vehicle transverse direction outer side of the outer pad 52 and the surface at the vehicle transverse direction inner side of the door outer panel 40 (see FIG. 3).

Figure 5:
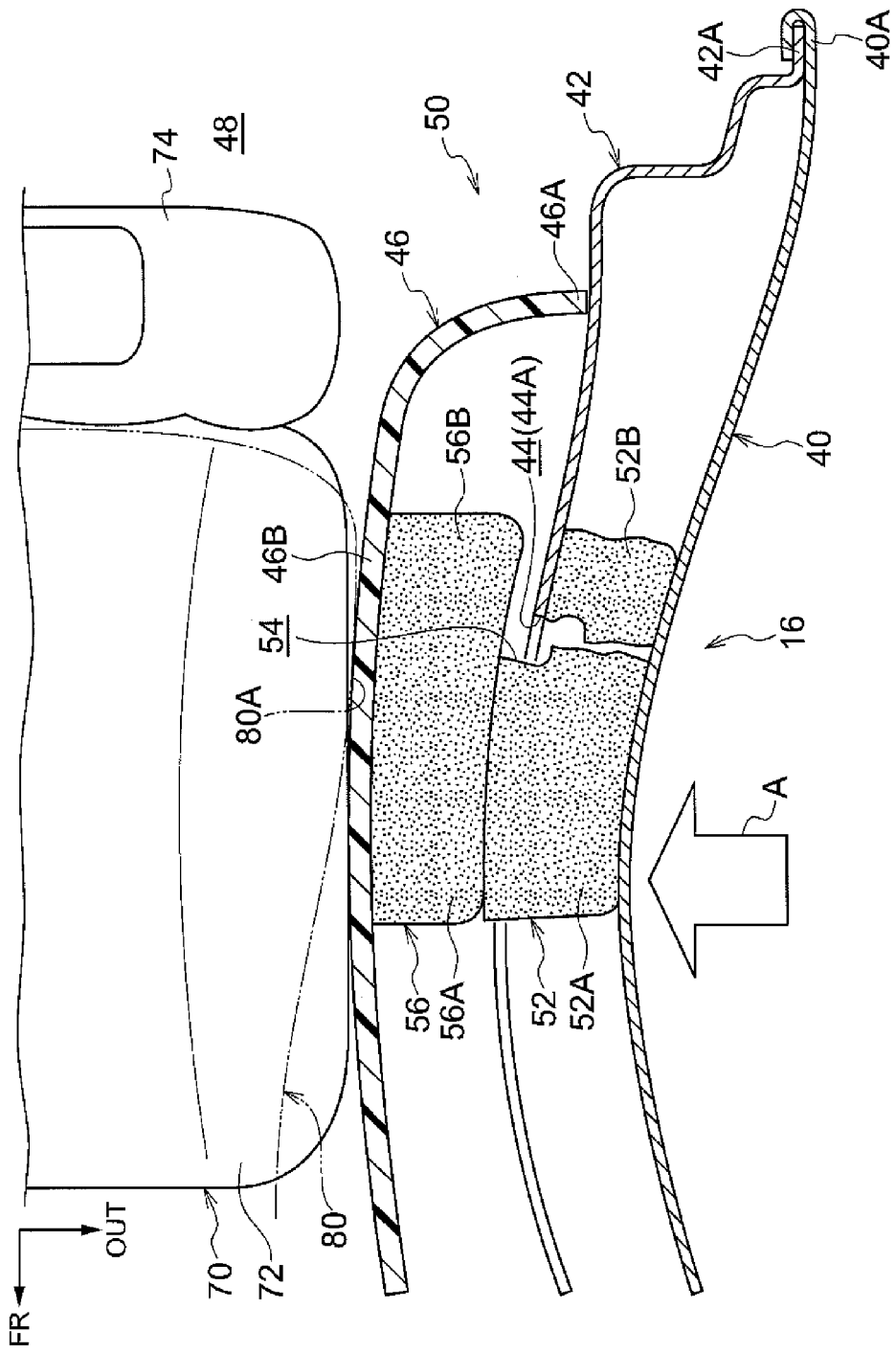
FIG. 5 is a plan sectional view that corresponds to FIG. 3 and shows deformed states of the outer pad and the inner pad at the front side door at the time of a side collision.

Due to the groove portion 54 being formed in the wall surface of the outer pad 52 along the outer peripheral edge 44A of the service hole 44, as shown in FIG. 5, accompanying the incursion of the door outer panel 40 at the time of a side collision, the outer pad 52 hits a vicinity of the outer peripheral edge 44A of the service hole 44 at the door inner panel 42, and the outer pad 52 is broken into the front side region (the first region) 52A and the rear side region (the second region) 52B with the groove portion 54 being the starting point. Due thereto, the outer pad 52 is divided into the front side region 52A and the rear side region 52B and moves toward the vehicle transverse direction inner side, and the front side region 52A passes-through the service hole 44 and pushes the inner pad 56 in toward the door trim 46 side, and the rear side region 52B pushes the inner pad 56 in toward the door trim 46 side via the door inner panel 42.

Although illustration thereof is omitted, a fragile portion such as a notch or plural slits (a fold line) or the like is formed in the resin plate 60 along the groove portion 54 (the outer peripheral edge 44A of the service hole 44). Due thereto, accompanying the incursion of the door outer panel 40 at the time of a side collision, the outer pad 52 hits the door inner panel 42 and the resin plate 60 breaks at the fragile portion, and due thereto, independent movement of the front side region 52A and the rear side region 52B is permitted. Further, there may be a structure in which a cut-out portion is provided at the resin plate 60 at the upper side of the bracket 64 and the vehicle rear side of the outer peripheral edge 44A of the service hole 44 as seen in a vehicle side view, and the resin plate 60 breaks easily along the outer peripheral edge 44A of the service hole 44 at the time of a side collision.

Further, although the resin plate 60 is a single part in the present embodiment, the resin plate 60 may be structured by two parts and disposed at a position corresponding to the front side region 52A and a position corresponding to the rear side region 52B.

Further, the positions, that correspond to the front side region 52A and the rear side region 52B, at the resin plate 60 are fixed to the impact beam 24 via the individual brackets 62, 64. Therefore, there is a structure in which, after the outer pad 52 breaks into the front side region 52A and the rear side region 52B, the front side region 52A and the rear side region 52B are not detached from the impact beam 24.

As shown in FIG. 3, a front seat 70 that serves as a vehicle seat is disposed at the vehicle transverse direction inner side of the front side door 16 at the interior of the vehicle cabin 48. The front seat 70 is provided at a position, that faces the front side door opening portion 12, of the vehicle cabin 48. The front seat 70 has a seat cushion 72 that supports the buttock region and the femoral region of a passenger 80 who is seated, and a seat back 74 that is provided along the vertical direction at the rear end portion in the vehicle longitudinal direction of the seat cushion 72 and that supports the back portion of the passenger. The outer pad 52 and the inner pad 56 are provided at a position, that corresponds to a waist region 80A of the passenger 80 who is seated in the front seat 70, along the vehicle transverse direction.

The operation and effects of the present embodiment are described next.

As shown in FIG. 5, when the door outer panel 40 intrudes in toward the vehicle transverse direction inner side (in the arrow A direction) at the time of a side collision, accompanying the incursion of the door outer panel 40, the outer pad 52 hits a vicinity of the outer peripheral edge 44A of the service hole 44 at the door inner panel 42, and the outer pad 52 breaks into the front side region (the first region) 52A and the rear side region (the second region) 52B with the groove portion 52 being the starting point. Due thereto, in the initial stage of the collision, the outer pad 52 is divided into the front side region 52A and the rear side region 52B, and they respectively move independently toward the vehicle transverse direction inner side. Therefore, accompanying the incursion of the door outer panel 40, the front side region 52A of the outer pad 52 passes-through the service hole 44 and directly pushes the inner pad 56 in toward the door trim 46 side, and the rear side region 52B of the outer pad 52 pushes the inner pad 56 in toward the door trim 46 side via the door inner panel 42.

Namely, in a structure in which the outer pad does not break, the outer pad catches on the door inner panel 42, and there is the possibility that the front side region that faces the service hole 44 cannot push the inner pad 56 at an early stage. However, in the vehicle side door structure 50 of the present embodiment, due to the front side region 52A and the rear side region 52B breaking, the front side region 52A can push the inner pad 56 at an early stage. As a result, at the time of a side collision, the waist region 80A of the passenger 80 who is seated in the front seat 70 can be pushed over a wide surface area and at an early stage. More concretely, due to the front side region 52A of the outer pad 52 pushing the inner pad 56 in toward the vehicle transverse direction inner side, the waist region 80A of the passenger 80 seated in the front seat 70 is pushed at an early stage, and the initial restraining force can be increased. Further, due to the rear side region 52B of the outer pad 52 pushing the inner pad 56 in toward the vehicle transverse direction inner side via the door inner panel 42, the area of restraining the waist region 80A of the passenger 80 seated in the front seat 70 can be broadened.

Further, as shown in FIG. 2, the front side region 52A and the rear side region 52B at the outer pad 52 are mounted to the impact beam 24 by the individual brackets 62, 64. Due thereto, even if the outer pad 52 breaks into the front side region 52A and the rear side region 52B at the time of a side collision, the front side region 52A and the rear side region 52B are supported without being detached from the impact beam 24, and therefore, the input to the waist region 80A of the passenger 80 seated in the front seat 70 is stable.

A second embodiment of the vehicle side door structure relating to the present invention is described next by using FIG. 6. Note that, in the second embodiment, structural elements, members and the like that are the same as those of the first embodiment are denoted by the same reference numerals, and detailed description thereof is omitted.

Figure 6:
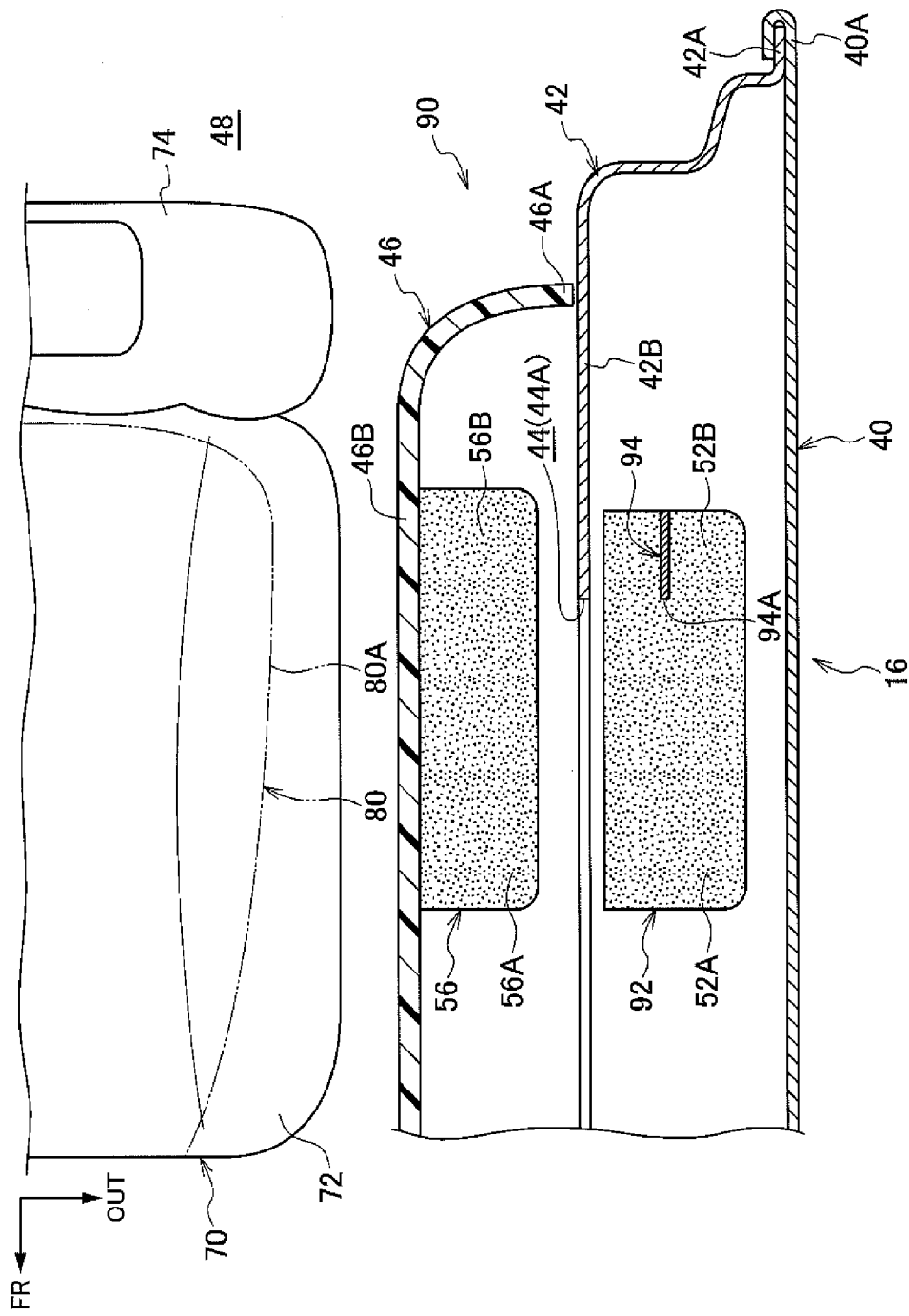
FIG. 6 is a plan sectional view, corresponding to FIG. 3, of a vehicle side door structure relating to a second embodiment.

As shown in FIG. 6, in a vehicle side door structure 90 of the present embodiment, a plate material 94 that is made of metal (e.g., made of iron) is embedded in the interior of the rear side region 52B of an outer pad 92 that faces the vertical wall portion 42B of the door inner panel 42. A front end 94A in the vehicle longitudinal direction of the plate material 94 is disposed along the outer peripheral edge 44A of the service hole 44 as seen in a vehicle side view. Due thereto, the border portion between the front end 94A of the plate material 94 at the rear side region 52B of the outer pad 92, and the front side region 52A in which the plate material 94 is not embedded, is a fragile portion that becomes the starting point of breakage at the time of a side collision.

Due to the rear side region 52B of the outer pad 92 hitting a vicinity of the outer peripheral edge 44A of the service hole 44 at the door inner panel 42 accompanying the incursion of the door outer panel 40 at the time of a side collision, the outer pad 92 breaks into the front side region 52A and the rear side region 52B with the border portion between the front end 94A of the plate material 94 and the front side region 52A being the starting point. Due thereto, the front side region 52A of the outer pad 92 passes-through the service hole 44 and pushes the inner pad 56 in toward the vehicle transverse direction inner side, and the rear side region 52B of the outer pad 92 pushes the inner pad 56 in toward the vehicle transverse direction inner side via the door inner panel 42. Therefore, the waist region 80A of the passenger 80 seated in the front seat 70 can be pushed at an early stage over a wide surface area. Further, by embedding the plate material 94 that is made of metal into the rear side region 52B of the outer pad 92 and making the rear side region 52B have a higher rigidity than the front side region 52A, at the time of a side collision, the inner pad 56 can be pushed more strongly toward the door trim 46 side via the door inner panel 42.

Note that, in the present embodiment, the plate material 94 that is made of metal is embedded in the interior of the rear side region 52B of the outer pad 92. However, instead of this, a plate material that is made of metal may be embedded in the interior of the front side region 52A of the outer pad 92, and the rear end of the plate material may be disposed along the outer peripheral edge 44A of the service hole 44 as seen in a vehicle side view.

A third embodiment of the vehicle side door structure relating to the present invention is described next by using FIG. 7. Note that, in the third embodiment, structural elements, members and the like that are the same as those of the first embodiment and the second embodiment are denoted by the same reference numerals, and detailed description thereof is omitted.

Figure 7:
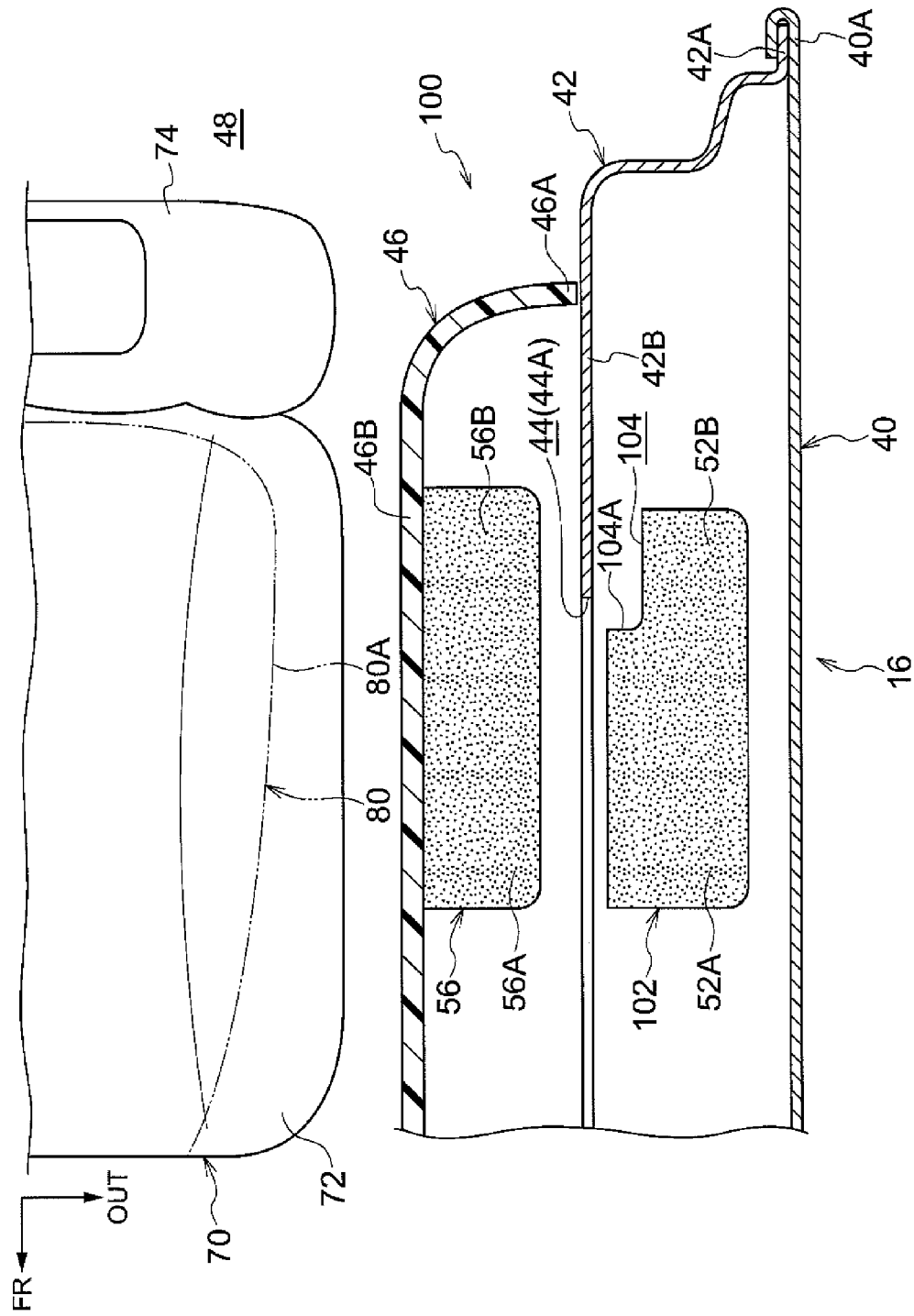
FIG. 7 is a plan sectional view, corresponding to FIG. 3, of a vehicle side door structure relating to a third embodiment.

As shown in FIG. 7, in a vehicle side door structure 100 of the present embodiment, a cut-out portion 104 serving as a fragile portion is formed at the vehicle transverse direction inner side of the rear side region 52B of an outer pad 102 that faces the vertical wall portion 42B of the door inner panel 42. As seen in a vehicle side view, a front end 104A of the cut-out portion 104 is disposed along the outer peripheral edge 44A of the service hole 44.

When a vicinity of the front end 104A of the cut-out portion 104 of the rear side region 52B of the outer pad 102 hits the outer peripheral edge 44A of the service hole 44 at the door inner panel 42 accompanying the incursion of the door outer panel 40 at the time of a side collision, the outer pad 102 breaks into the front side region 52A and the rear side region 52B with the vicinity of the front end 104A of the cut-out portion 104 being the starting point. Due thereto, the front side region 52A of the outer pad 102 passes-through the service hole 44 and pushes the inner pad 56 in toward the vehicle transverse direction inner side, and the rear side region 52B of the outer pad 102 pushes the inner pad 56 in toward the vehicle transverse direction inner side via the door inner panel 42. Therefore, the waist region 80A of the passenger 80 seated in the front seat 70 can be pushed at an early stage over a wide surface area.

Note that the fragile portion, that becomes the starting point of breaking into the front side region 52A and the rear side region 52B of the outer pad at the time of a side collision, is not limited to the vehicle side door structures 50, 90, 100 of the first embodiment through the third embodiment, and may be another structure. For example, the fragile portion may be a structure in which plural slits are formed in the outer pad along the outer peripheral edge 44A of the service hole 44, or a structure in which a hollow hole is provided at the interior of the outer pad along the outer peripheral edge 44A of the service hole 44, or the like. Namely, it suffices for the fragile portion to be a structure that provides the outer pad with a difference in strengths along the outer peripheral edge 44A of the service hole 44.

Note that, in the first embodiment through the third embodiment, the front side region 52A and the rear side region 52B of the outer pad 52, 92, 102 are formed by an elastic body that has the same hardness and is of foamed resin or the like for example. However, the present invention is not limited to this, and the rear side region 52B that faces the vertical wall portion 42B of the door inner panel 42 may be structured to be harder than the front side region 52A that faces the service hole 44. For example, the rear side region 52B can be made to be hard by making the foaming rate of the rear side region 52B, that faces the vertical wall portion 42B of the door inner panel 42, be lower than the foaming rate of the front side region 52A that faces the service hole 44. Further, the rear side region 52B can be made to be harder than the front side region 52A by changing the cross-sectional shape of the outer pad (e.g., a hollow cross-section or a U-shaped cross-section or the like). Due to this structure, at the time of a side collision, the rear side region 52B can more strongly push the inner pad 56 via the vertical wall portion 42B of the door inner panel 42.

A fourth embodiment of the vehicle side door structure relating to the present invention is described next by using FIG. 8. Note that, in the fourth embodiment, structural elements, members and the like that are the same as those of the first embodiment through the third embodiment are denoted by the same reference numerals, and detailed description thereof is omitted.

Figure 8:
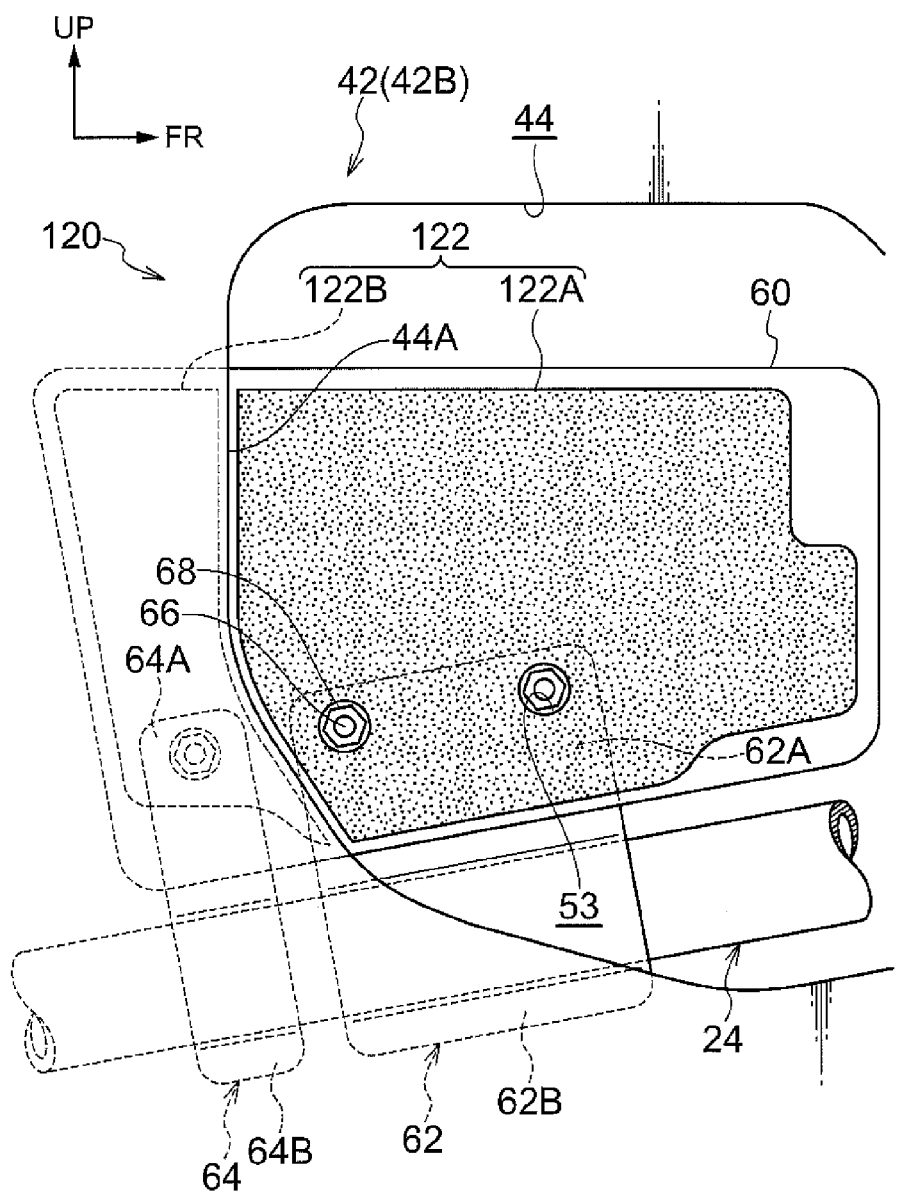
FIG. 8 is an enlarged side view of main portions showing, in a state viewed from a vehicle transverse direction inner side of a door inner panel, the mounted state of an outer pad that is used in the front side door to which a vehicle side door structure relating to a fourth embodiment is applied.

The mounted state of an outer pad 122, that is used in a front side door to which a vehicle side door structure 120 is applied, is shown in FIG. 8 in a side view seen from the vehicle transverse direction inner side. As shown in this drawing, the outer pad 122 is divided in advance, along the outer peripheral edge 44A at the vehicle rear side of the service hole 44, into a front side region (first region) 122A that faces the service hole 44 and a rear side region (second region) 122B that faces the vertical wall portion 42B of the door inner panel 42. The front side region 122A and the rear side region 122 B are fixed by an adhesive or the like to the resin plate 60 in a state in which a gap is formed between the rear end surface of the front side region 122A and the front end surface of the rear side region 122B.

Although illustration thereof is omitted, a fragile portion such as a notch or plural slits (a fold line) or the like is formed in the resin plate 60 along the outer peripheral edge 44A of the service hole 44. Due to the resin plate 60 being broken with the fragile portion being the starting point at the time of a side collision, independent movement of the front side region 122A and the rear side region 122B is permitted.

Further, the front side region 122A and the rear side region 122B of the outer pad 122 are formed by elastic bodies that are formed from foamed resin or rubber, and the rear side region 122B is structured to be harder than the front side region 122A. In the present embodiment, the rear side region 122B is made to be hard by making the foaming rate of the rear side region 122B lower than the foaming rate of the front side region 122A.

In this vehicle side door structure 120, the outer pad 122 is divided in advance into the front side region 122A and the rear side region 122B. At the time of a side collision, accompanying the incursion of the door outer panel 40 (see FIG. 3), the resin plate 60 is broken with the fragile portion being the starting point, and the front side region 122A and the rear side region 122B independently move toward the vehicle transverse direction inner side. Namely, accompanying the incursion of the door outer panel 40, the front side region 122A passes-through the service hole 44 and pushes the inner pad 56 (see FIG. 3) in toward the vehicle transverse direction inner side, and the rear side region 122B pushes the inner pad 56 in toward the vehicle transverse direction inner side via the vertical wall portion 42B of the door inner panel 42. Due thereto, the waist region of the passenger seated in the front seat can be pushed at an early stage over a wide surface area.

Further, at the outer pad 122, the rear side region 122B is structured to be harder than the front side region 122A, and, at the time of a side collision, the rear side region 122B can more strongly push the inner pad 56 via the vertical wall portion 42B of the door inner panel 42.

Note that, in the present embodiment, the rear side region 122B is made to be hard by making the foaming rate of the rear side region 122B lower than the foaming rate of the front side region 122A. However, the present invention is not limited to this and may be a structure in which the rear side region 122B is made to be harder than or have a higher rigidity than the front side region 122A by varying the cross-sectional shapes of the front side region 122A and the rear side region 122B (e.g., a hollow cross-section, a change in the thickness in the vehicle transverse direction, or the like), or by embedding a metal plate in the interior of the rear side region 122B, or the like.

A fifth embodiment of a passenger protecting system relating to the present invention is described next by using FIG. 9. Note that, in the fifth embodiment, structural elements, members and the like that are the same as those of the first embodiment through the fourth embodiment are denoted by the same reference numerals, and detailed description thereof is omitted.

Figure 9:
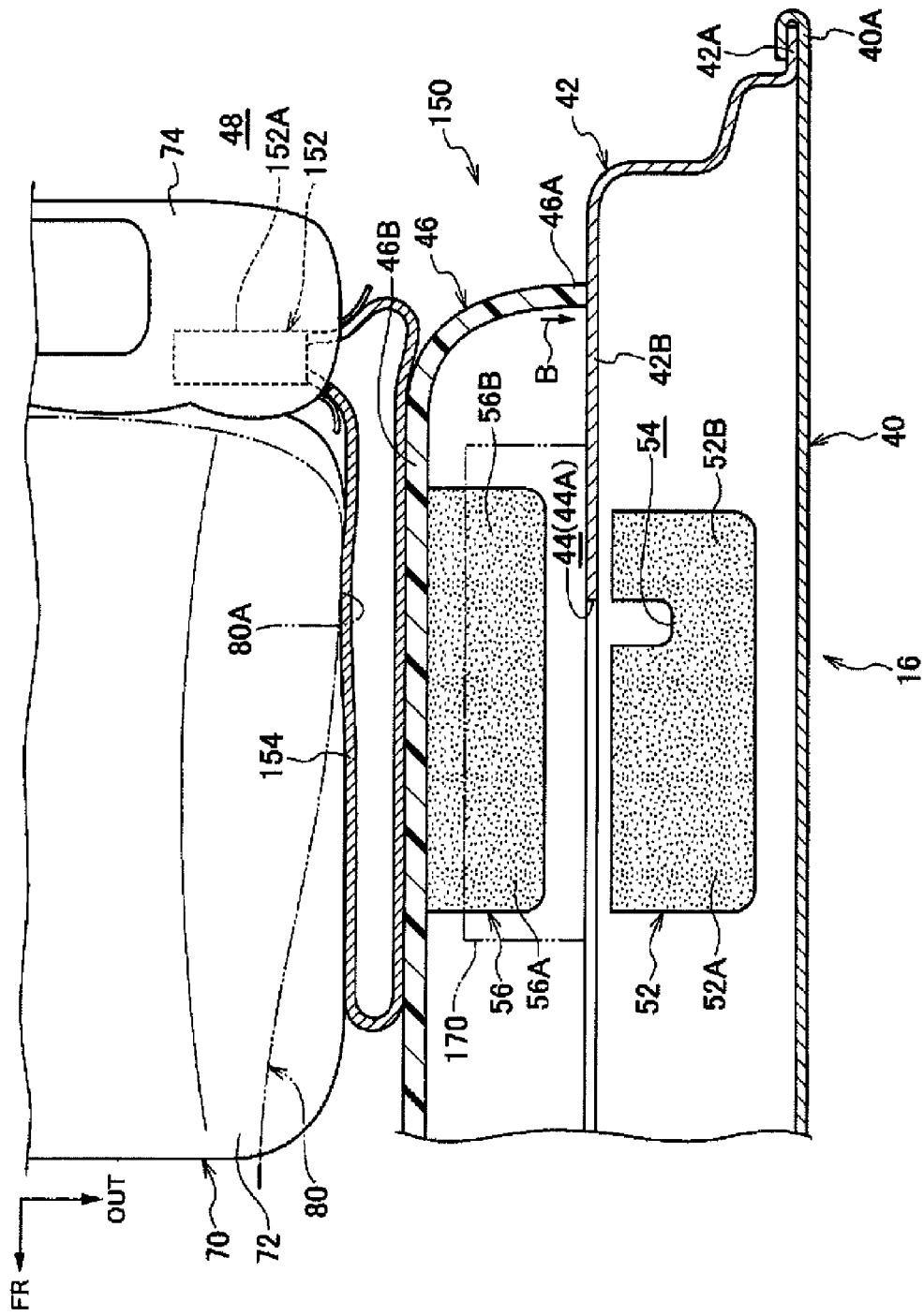
FIG. 9 is a plan sectional view showing a state in which a side airbag of a side airbag device has inflated and expanded between the front side door and a vehicle seat to which a passenger protecting system relating to a fifth embodiment is applied.

The structure in the vicinity of the front side door 16, to which a passenger protecting system 150 is applied, is shown in FIG. 9 in a plan sectional view. As shown in this drawing, in the passenger protecting system 150, a side airbag device 152 is installed in the side portion at the vehicle transverse direction outer side of the seat back 74 that structures a portion of the front seat (vehicle seat) 70. The side airbag device 152 has a side airbag 154 that serves as a bag body and is stored by being folded-up within a case 152A, and an inflator (not illustrated) that, when a side collision state is detected by a side collision sensor (not shown) and electricity is supplied by a controller (not shown), generates a large amount of gas and jets the gas out into the side airbag 154, and the like.

In this side airbag device 152, when a large acceleration that is greater than or equal to a predetermined value is applied to the vehicle due to a side collision, this state is detected by the side collision sensor, and a predetermined current is supplied from the controller to an ignition device of the inflator. Due thereto, the inflator operates and generates a large amount of gas, and the side surface of the seat back 74 opens, and the side airbag 154 is inflated and expanded. Namely, by inflating and expanding the side airbag 154 between the door trim 46 and the passenger 80 who is seated in the front seat 70, kinetic energy is absorbed and the passenger is protected.

In accordance with this passenger protecting system 150, when the side airbag 154 is inflated and expanded between the door trim 46 and the passenger 80 seated in the front seat 70 at the time of a side collision, the surfaces at both vehicle transverse direction sides of the side airbag 154 hit the waist region 80A of the passenger 80 and the door trim 46. Due thereto, the side airbag 154 pushes the door trim 46 toward the vehicle transverse direction outer side, and is inputted from the end portion 46A of the door trim 46 to the door inner panel 42 as shown by arrow B. Moreover, due to a vicinity of the outer peripheral edge 44A of the service hole 44 at the door inner panel 42 pushing the outer pad 52 toward the vehicle outer side, the outer pad 52 breaks into the front side region 52A and the rear side region 52B with the groove portion 54 being the starting point. Due thereto, accompanying the incursion of the door outer panel 40, the front side region 52A and the rear side region 52B can independently move toward the vehicle transverse direction inner side.

In this passenger protecting system 150, before the outer pad 52 is divided due to the incursion of the door outer panel 40, the outer pad 52 can be divided due to the inflation and expansion of the side airbag 154, and the waist region 80A of the passenger 80 can be pushed at an early stage over a wide surface area.

Note that, in the passenger protecting system 150 of the present embodiment, the side airbag device 152 is provided at the side portion at the vehicle transverse direction outer side of the seat back 74. However, instead of this, as shown by the two-dot chain line in FIG. 9, there may be a structure in which a side airbag device 170 is provided at the door inner panel 42 side at the rear portion of the door trim 46 interior, and, at the time of a side collision, the door trim 46 opens and the side airbag is inflated and expanded. Even with this structure, due to the side airbag, that has been inflated and expanded, hitting the door trim 46 and the waist region 80A of the passenger 80 seated in the front seat 70, the outer pad 52 can be broken into the front side region 52A and the rear side region 52B with the groove portion 54 as the starting point by utilizing the input to the door inner panel 42.

Note that, in the above-described first embodiment through fifth embodiment, the front side region (the first region) that faces the service hole 44 and the rear side region (the second region) that faces the door inner panel 42 are provided due to the outer pad being disposed so as to span, in the vehicle longitudinal direction, over the outer peripheral edge 44A at the vehicle rear side of the service hole 44. However, the present invention is not limited to this structure. For example, there may be a structure in which the rear side region (the first region) that faces the service hole 44 and the front side region (the second region) that faces the door inner panel are provided due to the outer pad being disposed so as to span, in the vehicle longitudinal direction, over the outer peripheral edge 44A at the front side of the service hole 44. Namely, at the time of a side collision, the rear side region (the first region) may pass-through the service hole 44 and push the inner pad toward the door trim side, and the front side region (the second region) may separate from the rear side region and push the inner pad toward the door trim side via the door inner panel.

Further, in the above-described first embodiment through fifth embodiment, the vehicle side door structure 50 of the present invention is applied to the front side door 16. However, the present invention is not limited to this, and the vehicle side door structure 50 of the first embodiment through the fifth embodiment may be applied to the rear side door 20.

The invention claimed is:

1. A vehicle side door structure comprising:
   a door outer panel that is disposed at a vehicle transverse direction outer side;
   a door inner panel that is disposed at a vehicle transverse direction inner side, and is formed in a shape of a bag together with the door outer panel, and in which a service hole is formed in an intermediate portion in a vehicle longitudinal direction;
   a door trim that is mounted to a vehicle transverse direction inner side of the door inner panel;
   an inner pad that is disposed between the door inner panel and the door trim, and is provided so as to span, in the vehicle longitudinal direction, over an outer peripheral edge of the service hole as seen in a vehicle side view, and that absorbs impact from a vehicle side surface; and
   an outer pad that is disposed between the door outer panel and the door inner panel, and is provided so as to overlap a vehicle transverse direction outer side of the inner pad as seen in a vehicle side view, and that has a first region that, at a time of a side collision, is pushed by the door outer panel, passes-through the service hole and pushes the inner pad toward the door trim side, and a second region that, at a time of a side collision, separates from the first region along the outer peripheral edge of the service hole, and, independently of the first region, pushes the inner pad toward the door trim side via the door inner panel.

2. The vehicle side door structure of claim 1, wherein a fragile portion is provided at the outer pad along the outer peripheral edge of the service hole so as to become a starting point of breaking the outer pad into the first region and the second region at a time of a side collision.

3. A passenger protecting system comprising:
   the vehicle side door structure of claim 2,
   wherein a side airbag device, at which, at a time of a side collision, a side airbag inflates and expands between the door trim and a waist region of a passenger seated in a vehicle seat, is provided at an interior of the door trim or at a side portion of a seat back that structures a portion of the vehicle seat.

4. The vehicle side door structure of claim 1, wherein
   an impact beam extends along the vehicle longitudinal direction between the door outer panel and the door inner panel, and
   the first region and the second region at the outer pad are mounted to the impact beam by individual brackets.

5. The vehicle side door structure of claim 1, wherein, at the outer pad, the second region is structured to be harder than, or have a higher rigidity than, the first region.

6. The vehicle side door structure of claim 1, wherein the outer pad is divided in advance along the outer peripheral edge of the service hole into the first region and the second region.

7. The vehicle side door structure of claim 6, wherein
   an impact beam extends along the vehicle longitudinal direction between the door outer panel and the door inner panel, and
   the first region and the second region at the outer pad are mounted to the impact beam by individual brackets.

8. The vehicle side door structure of claim 6, wherein, at the outer pad, the second region is structured to be harder than, or have a higher rigidity than, the first region.

* * * * *